United States Patent
Mimura

[11] Patent Number: 6,056,664
[45] Date of Patent: May 2, 2000

[54] DIFFERENTIAL GEAR

[76] Inventor: Kenji Mimura, 29-1105, Wakabadai 4-chome, Asahi-ku, Yokohama-shi, Kanagawa 241-0801, Japan

[21] Appl. No.: 09/328,258

[22] Filed: Jun. 10, 1999

[30] Foreign Application Priority Data

Feb. 12, 1999 [JP] Japan .................................. 11-34189

[51] Int. Cl.[7] .................................................. F16H 48/08
[52] U.S. Cl. ............................................................ 475/246
[58] Field of Search .................................... 475/246, 253, 475/220, 234

[56] References Cited

U.S. PATENT DOCUMENTS

| | | | |
|---|---|---|---|
| 2,548,258 | 4/1951 | Griffith | 475/246 |
| 5,234,388 | 8/1993 | Nordkvist | 475/246 |
| 5,897,453 | 4/1999 | Mimura | 475/246 |

Primary Examiner—Sherry L. Estremsky
Attorney, Agent, or Firm—Lowe, Hauptman, Gopstein, Gilman & Berner, LLP

[57] ABSTRACT

A differential gear which can always obtain a stable differential limiting force even in low-speed rotation. A plurality of rollers are provided between a raceway surface integrally rotating with an input-side rotating body and a raceway surface integrally rotating with an output-side rotating body. A tilt angle of the axes of rolling of the rollers with respect to the axis of rotation of the raceway surfaces is made smaller than 20°, and a tilt angle of the axes of rolling of the rollers with respect to a plane including the axis of rotation of the raceway surfaces is made larger than 25° and smaller than 90°. Thereby, a stable frictional force can be produced between the rollers and the raceway surfaces, and a differential limiting force without producing a stick-slip even in low-speed rotation can be obtained.

12 Claims, 11 Drawing Sheets

DIFFERENTIAL GEAR

BACKGROUND OF THE INVENTION

1. Field of the Invention

The present invention relates to a differential gear which allows a difference in rotation between right and left driving wheels or front and rear driving wheels of an automobile.

2. Description of the Related Art

Conventionally, an automotive differential gear is generally such that pinion gears are interposed between a pair of bevel gears connected to output shafts, and the pinion gears are rotated at the time of differential motion so as to allow a difference in rotation between the output shafts. Also, as a differential gear having a differential limiting device, there is known a differential gear in which a multiple disk clutch is disposed on the back surface side of the bevel gear, and the multiple disk clutch is pressed by a thrust force of the bevel gear to produce a frictional force, by which differential is limited.

However, a mechanism for transmitting power by utilizing sliding friction in a semi-connecting state like the aforementioned multiple disk clutch has a problem in that the clutch disks produce static friction and dynamic friction intermittently in low-speed rotation, that is, a so-called stick-slip, so that a differential limiting force becomes unstable. Also, it has a problem in that noise and vibration are generated by the stick-slip.

SUMMARY OF THE INVENTION

The present invention has been made to solve the above problems, and accordingly an object thereof is to provide a differential gear which can always obtain a stable differential limiting force even in low-speed rotation.

To attain the above object, according to a first aspect of the invention, the present invention provides a differential gear having an input-side rotating body rotating on the axis by an external driving force, a pair of output-side rotating bodies arranged coaxially with the input-side rotating body, and a differential transmission mechanism for transmitting a rotational force of the input-side rotating body to each of the output-side rotating bodies while allowing the difference in rotation between the output-side rotating bodies, said differential gear further comprising a plurality of rollers which are arranged between a raceway surface integrally rotating with the input-side rotating body and a raceway surface integrally rotating with the output-side rotating body, and roll while contacting with the raceway surfaces when a difference in rotation occurs between the output-side rotating bodies; and a roller holder for rotatably holding the rollers at intervals in the peripheral direction of the raceway surfaces. The axes of rolling of the rollers are tilted so as to make an angle smaller than 20° with respect to the axis of rotation of the input-side and output-side rotating bodies, and is tilted so as to make an angle larger than 25° and smaller than 90° with respect to a plane including the axis of rotation of the input-side and output-side rotating bodies. Thereby, if a difference in rotation occurs between the output-side rotating bodies, the rollers roll while contacting with the raceway surfaces. At this time, the rollers intend to roll in the direction tilted with respect to the rotation tracks of the raceway surfaces. While this rolling motion, however, is restricted by the roller holder, the rollers roll along the rotation tracks of the raceway surfaces, so that a frictional force is produced between the rollers and the raceway surfaces. In this case, by making the tilt angle of the axes of rolling of the rollers with respect to the axis of rotation of rotating bodies smaller than 20°, and then making the tilt angle of the axes of rolling of the rollers with respect to the plane including the axis of rotation of rotating bodies larger than 25° and smaller than 90°, a stable frictional force is always produced.

According to a second aspect of the invention, in the differential gear of the first aspect of the invention, the axes of rolling of the rollers are tilted so as to make an angle larger than 5° with respect to the axis of rotation of the input-side and output-side rotating bodies, and are tilted in the same direction so as to make a predetermined angle with respect to the plane including the axis of rotation of the input-side and output-side rotating bodies. Thereby, if a difference in rotation occurs between the output-side rotating bodies, the rollers roll while contacting with the raceway surfaces. At this time, the rollers intend to roll in the direction tilted with respect to the rotation tracks of the raceway surfaces. While this rolling motion, however, is restricted by the roller holder, the rollers roll along the rotation tracks of the raceway surfaces, so that a frictional force is produced between the rollers and the raceway surfaces. In this case, by making the tilt angle of the axis of rolling of the rollers with respect to the axis of rotation of rotating bodies larger than 5°, and then making the axes of rolling of the rollers tilted in the same direction with respect to the plane including the axis of rotation of the rotating bodies, a stable frictional force is always produced.

According to a third aspect of the invention, in the differential gear of the first aspect of the invention, the axes of rolling of the rollers are tilted so as to make an angle larger than 3° with respect to the axis of rotation of the input-side and output-side rotating bodies, and each of a predetermined number of axes of rolling of the rollers are alternately tilted in the opposite direction so as to make a predetermined angle with respect to the plane including the axis of rotation of the input-side and output-side rotating bodies. Thereby, if a difference in rotation occurs between the output-side rotating bodies, the rollers roll while contacting with the raceway surfaces. At this time, the rollers intend to roll in the direction tilted with respect to the rotation tracks of the raceway surfaces. While this rolling motion, however, is restricted by the roller holder, the rollers roll along the rotation tracks of the raceway surfaces, so that a frictional force is produced between the rollers and the raceway surfaces. At this time, when the input-side and output-side rotating bodies are rotated, some rollers tilted in the same direction intend to roll in one axial direction of the rotating bodies, and other rollers tilted in the opposite direction intend to roll in the other axial direction of the rotating bodies. Therefore, the magnitude of a frictional force in the rotating direction of the rotating body can be set arbitrarily by the number of the rollers tilted in the opposite direction to each other. In this case, by making the tilt angle of the axes of rolling of the rollers with respect to the axis of rotation of the rotating bodies larger than 3°, a stable frictional force is always produced.

According to a fourth aspect of the invention, in the differential gear of the third aspect of the invention, the same number of rollers tilted in the opposite direction with respect to the plane including the axis of rotation of the input-side and output-side rotating bodies are alternately arranged in the peripheral direction of the input-side and output-side rotating bodies. Thereby, in addition to the operation of the third aspect of the invention, an equal frictional force is produced even when the rollers are rolled in either direction.

According to a fifth aspect of the invention, in the differential gear of the first, second, third, or fourth aspect of the invention, the raceway surfaces are formed into a convex shape with respect to the outer peripheral surface of the roller in a cross section including the axis of rolling of the roller. Thereby, in addition to the operation of the first, second, third, or fourth aspect of the invention, the contact pressure at both end sides in the axial direction of the roller can be decreased.

According to a sixth aspect of the invention, in the differential gear of the first, second, third, or fourth aspect of the invention, the outer peripheral surfaces of the rollers are formed into a convex shape with respect to the raceway surface in a cross section including the axis of rolling of the roller. Thereby, in addition to the operation of the first, second, third, or fourth aspect of the invention, the contact pressure at both end sides in the axial direction of the roller can be decreased.

Thereupon, according to the differential gear of the first aspect of the invention, a frictional force without generating a stick-slip even in low-speed rotation can be produced, so that a stable differential limiting force can always be obtained by this frictional force, and moreover the occurrence of noise and vibration can be surely prevented. Also, the magnitude of the frictional force can be arbitrarily changed by setting the tilt angle of the roller, so that the intended differential limiting force can be obtained.

According to the differential gear of the second aspect of the invention, a more effective and stable frictional force can be produced in addition to the effects of the first aspect of the invention. In this case, since a different frictional force can be produced depending on the rolling direction of the roller, this differential gear is very advantageous when such an operation is intended.

According to the differential gear of the third aspect of the invention, an effective and stable frictional force can be always produced in addition to the effects of the first aspect of the invention, like the second aspect of the invention. In this case, since the magnitude of the frictional force in the rolling direction of the roller can be set arbitrarily, this differential gear can be widely used according to the intended uses.

According to the differential gear of the fourth aspect of the invention, in addition to the effects of the third aspect of the invention, since an equal frictional force can be produced even when the rollers are rolled in either direction, this differential gear is very advantageous when such an operation is intended.

According to the differential gear of the fifth and sixth aspects of the invention, in addition to the effects of the first, second, third, or fourth aspect of the invention, since the contact pressure at both end sides in the axial direction of the roller with respect to the raceway surface can be decreased, nonuniform wear of the roller can be reduced, so that the durability can be improved.

DESCRIPTION OF THE PREFERRED EMBODIMENTS

FIGS. 1 through 8 show a first embodiment of the present invention.

Figure 1:
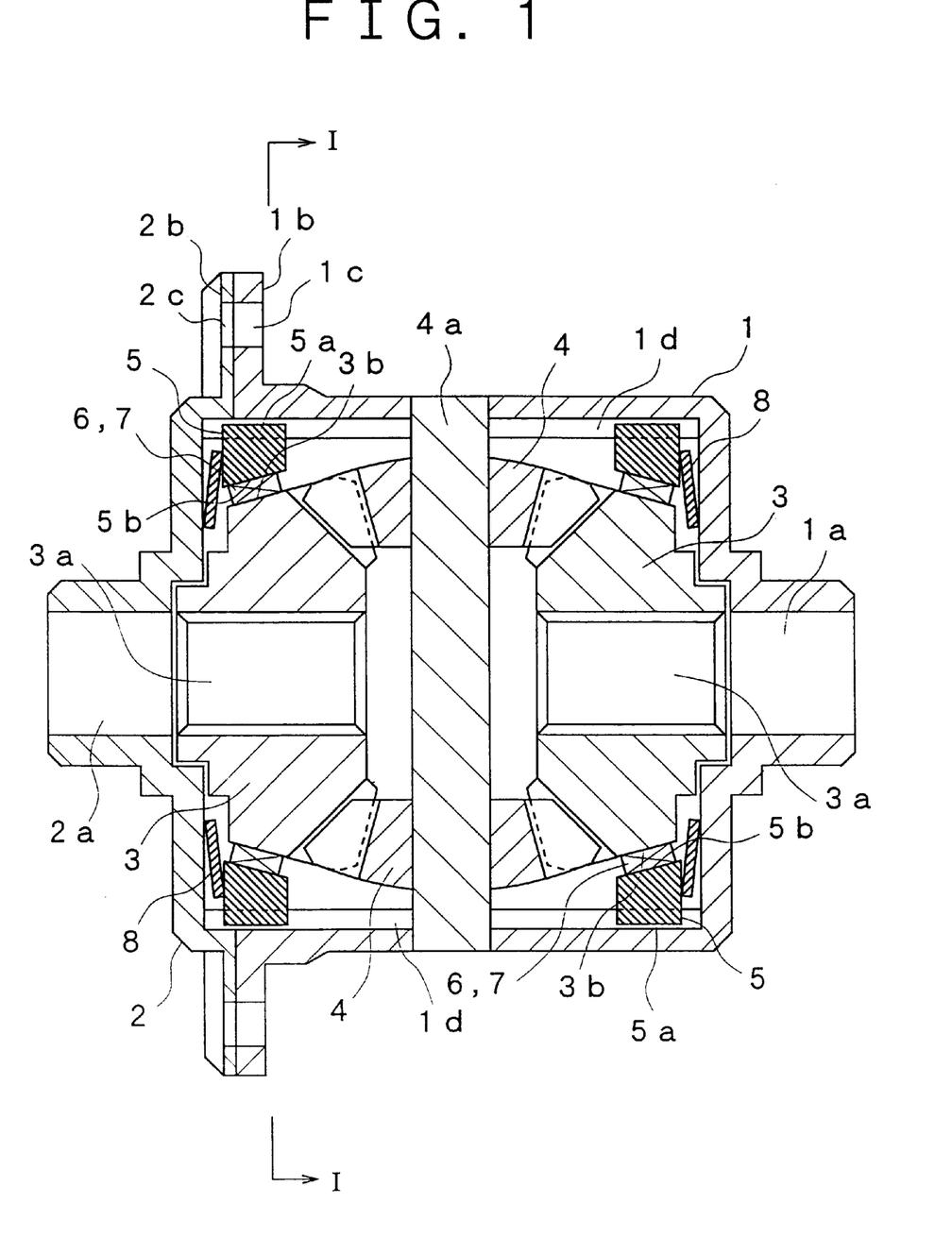
FIG. 1 is a side sectional view of a differential gear in accordance with a first embodiment of the present invention.
Figure 2:
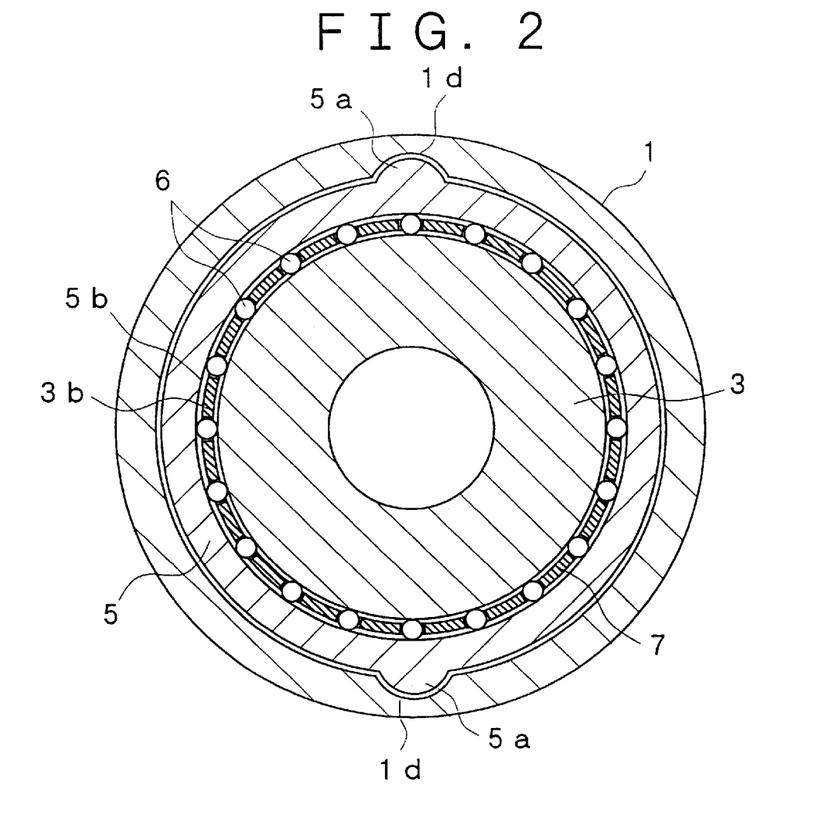
FIG. 2 is a sectional view taken along the line I—I of FIG. 1.

This differential gear comprises a gear case 1, a gear case cover 2 for closing one end of the gear case 1, a pair of bevel gears 3 disposed coaxially so as to be opposed to each other, a plurality of pinion gears 4 disposed between the bevel gears 3, a pair of pressure rings 5 integrally rotating with the gear case 1, a plurality of rollers 6 disposed between the pressure ring 5 and the bevel gear 3, cages 7 for rotatably holding the rollers 6 at intervals, and a pair of cone springs 8 for pressing the pressure ring 5 against the bevel gear 3. The gear case 1, the gear case cover 2, and the pressure rings 5 constitute an input-side rotating body, and the bevel gears 3 configure an output-side rotating body.

The gear case 1 has a cylindrical shape whose one end is open, and a bearer 1a for supporting one bevel gear 3 is provided on the other end side thereof. A flange 1b is provided around the gear case 1, and the flange 1b is formed with a plurality of holes 1c for bolt insertion. Also, a plurality of grooves 1d extending in the axial direction are formed at intervals in the peripheral direction on the inner surface of the gear case 1.

The gear case cover 2 is formed into a disk shape, and a bearer 2a for supporting the other bevel gear 3 is provided in the center thereof. A flange 2b is provided around the gear case cover 2, and the flange 2b is formed with a plurality of holes 2c for bolt insertion. That is to say, the gear case cover 2 is assembled to the gear case 1 by bolts (not shown) fastening the flanges 1b and 2b each other.

Figure 3:
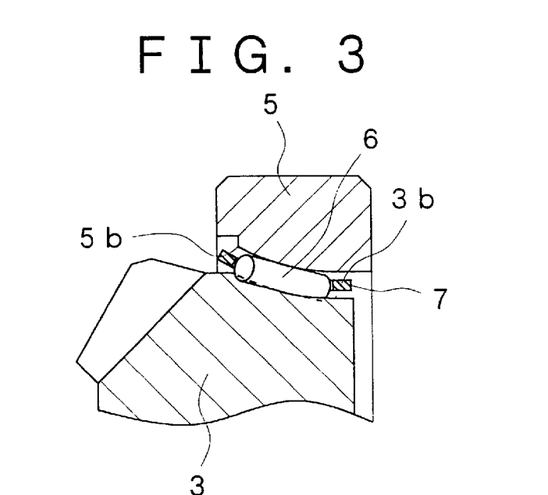
FIG. 3 is a side sectional view of a principal portion of the differential gear.

The bevel gears 3 are arranged so that the tooth sides are opposed to each other, and they each have a connecting portion 3a for connecting with a drive shaft (not shown) on the wheel side. On the back surface side of the bevel gear 3, a raceway surface 3b opposed to the pressure ring 5 is formed. The raceway surface 3b has a tapered shape with the axis of rotation being the center, and is formed so as to form a concave curve in the cross section in parallel to the axis of rotation as shown in FIG. 3.

The pinion gears 4 are rotatably fixed to a pinion shaft 4a supported on the gear case 1, and mesh with the bevel gears 3.

The pressure rings 5 are formed into a ring shape with the axis of rotation being the center, and a plurality of protrusions 5a each fitting in the groove 1d in the gear case 1 are provided on the outer peripheral surface of the pressure ring 5. That is to say, the pressure rings 5 are supported on the gear case 1 so as to be movable in the axial direction. Also, on the inner peripheral surface of the pressure ring 5, a raceway surface 5b opposed to the raceway surface 3b of the bevel gear 3 is formed. The raceway surface 5b has a tapered shape with the axis of rotation being the center, and is formed so as to form a convex curve in the cross section in parallel to the axis of rotation as shown in FIG. 3.

The rollers 6 each have a columnar shape whose outer peripheral surface extends uniformly in the axial direction, and are arranged at equal intervals in the peripheral direction of the raceway surfaces 3b and 5b.

Figure 4:
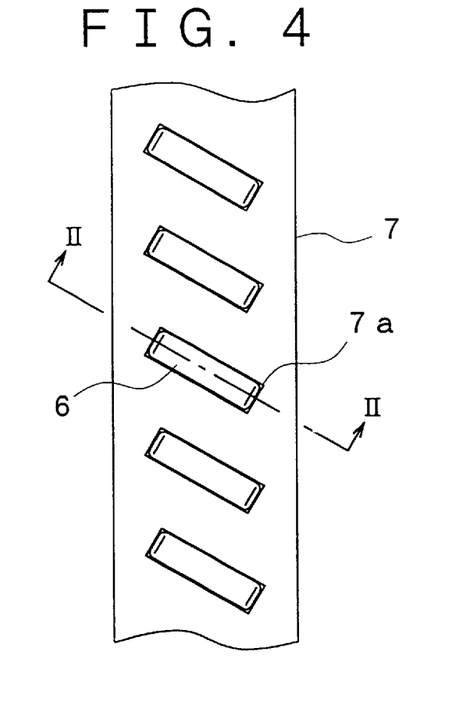
FIG. 4 is a development of rollers and a cage.
Figure 5A:
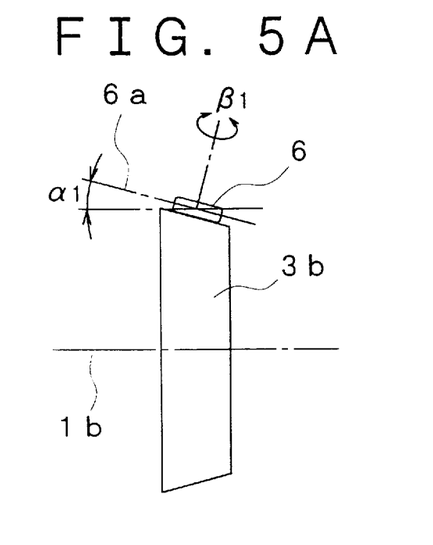
FIG. 5A is a schematic view showing a tilt angle of the roller.
Figure 5B:
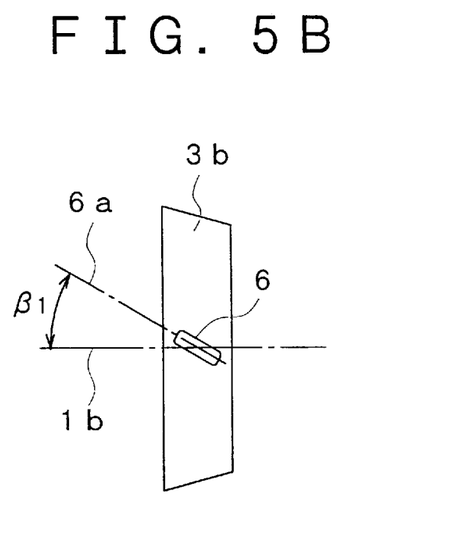
FIG. 5B is a schematic view showing a tilt angle of the roller.

The cage 7 is formed into a ring shape with the axis of rotation with the center, being tapered so as to be curved along the raceway surfaces 3b and 5b, and is formed so that the thickness thereof is smaller than the outside diameter of the roller 6. The cage 7 is formed with a plurality of holes 7a for rotatably containing the rollers 6, and the holes 7a are arranged at equal intervals in the peripheral direction of the cage 7. In this case, the holes 7a are formed so that the axes of rolling of the rollers 6 are tilted in the same direction as shown in FIG. 4. Also, as shown in FIG. 5A, the axis of rolling 6a of the roller 6 makes a tilt angle $\alpha 1$ with respect to the axis of rotation 1b of the gear case 1, and at the same time as shown in FIG. 5B, makes a tilt angle $\beta 1$ with respect to a plane including the axis of rotation 1b. In this case, the tilt angle $\alpha 1$ of the roller 6 is set so as to be larger than 5° and smaller than 20°, and the tilt angle $\beta 1$ is set so as to be larger than 25° and smaller than 90°. The tilt angle $\beta 1$ is an angle viewed in the direction perpendicular to the axis of rolling 6a of the roller 6.

The cone springs 8 are disposed on the back surface sides of the bevel gear 3. One cone spring 8 is interposed between the inside surface of the gear case 1 and one pressure ring 5 in a compressed state in the axial direction, and the other cone spring 8 is interposed between the inner surface of the gear case cover 2 and the other pressure ring 5 in the same state.

In the differential gear configured as described above, a ring gear (not shown) connected to the engine side is fitted to the flange 1b of the gear case 1 so that the gear case 1 is rotated by the driving force from the engine. In this case, when a difference in rotation occurs between the drive shafts during the turning of a vehicle, the pinion gears 4 between the bevel gears 3 are autorotated, by which the differential motion of the drive shafts is achieved. When the driving force is applied to the gear case 1, a thrust force in the axial direction; that is, a force in the direction such that the bevel gear 3 moves away from the pinion gear 4; is produced on the bevel gear 3 by the inclination of the engaging tooth flanks of the bevel gear 3 and the pinion gear 4. When a difference in rotation is thereby produced between the drive shafts, the rollers 6 roll while being pressed on the raceway surface 3b of the bevel gear 3 and the raceway surface 5b of the pressure ring 5, so that a differential limiting force is produced by a frictional force between the rollers 6 and the raceway surfaces 3b and 5b. In this case, a pre-load by the cone spring 8 is given to the rollers 6 and the raceway surfaces 3b and 5b.

Figure 6A:
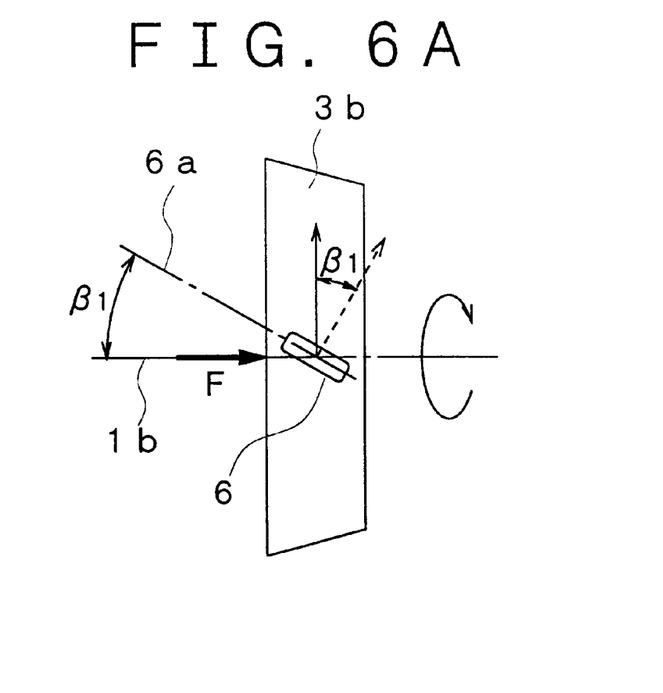
FIG. 6A is an explanatory view for illustrating the operation of the differential gear.
Figure 6B:
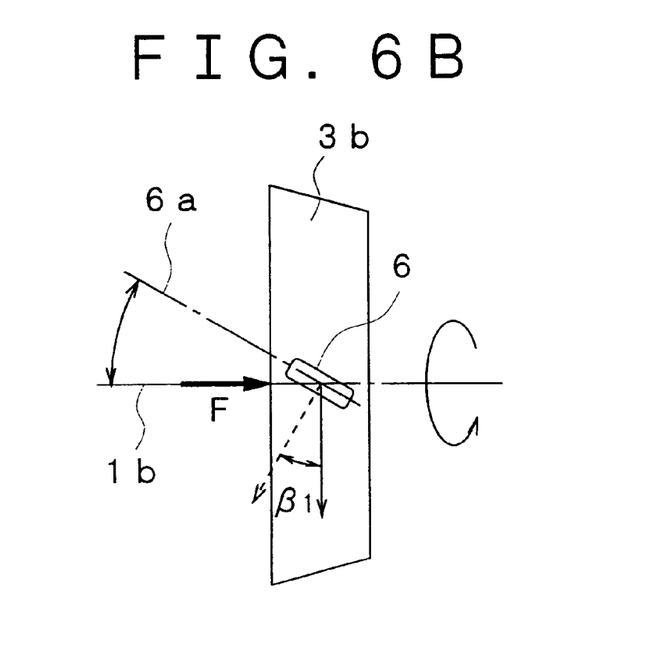
FIG. 6B is an explanatory view for illustrating the operation of the differential gear.

That is, as shown in FIG. 6A, if the raceway surface 3b of the bevel gear 3 is rotated in one direction (hereinafter referred to as a normal rotation) while being subjected to a thrust force F in the axial direction, the roller 6 intends to roll in one axial direction of the axis of rotation, that is, in the direction inclined at the angle $\beta 1$ with respect to the rotation track as indicated by an arrow of broken line in the figure (in the direction in which the diameters of the raceway surfaces 3b and 5b decrease), but while this rolling motion is restricted by the cage 7, it rolls along the rotation track of the raceway surfaces 3b and 5b as indicated by an arrow of solid line in the figure. Therefore, a frictional force in proportional to the thrust force F is produced between the roller 6 and the raceway surfaces 3b and 5b. Also, as shown in FIG. 6B, if the raceway 3b is rotated in the other direction (hereinafter referred to as a reverse rotation), the roller 6 intends to roll in the other axial direction of the axis of rotation, that is, in the direction inclined at the angle $\beta 1$ with respect to the rotation track as indicated by an arrow of broken line in the figure (in the direction in which the diameters of the raceway surfaces 3b and 5b increase), but while this rolling motion is restricted by the cage 7, it rolls along the rotation track of the raceway surfaces 3b and 5b as indicated by an arrow of solid line in the figure. Therefore, a frictional in force proportional to the thrust force F is produced between the roller 6 and the raceway surfaces 3b and 5b . At this time, since the roller 6 produces sliding friction while rolling, no static friction occurs and a stable resisting force due to dynamic friction can be obtained. Even if static friction occurs at the initial stage, it is converted immediately to dynamic friction by the roller 6. Also, in the normal rotation of the raceway surface 3b, the roller 6 rolls in the direction in which the diameters of the raceway surfaces 3b and 5b decrease, and in the reverse rotation, the roller 6 rolls in the direction in which the diameters of the raceway surfaces 3b and 5b increase. Therefore, even if the thrust force F is equal, the magnitude of the produced frictional force differs depending on the direction of the rotation of the raceway surface 3b, and the frictional force in the normal rotation is larger than the frictional force in the reverse rotation.

In the above-described embodiment, the rollers 6 on the side of each bevel gear 3 are arranged so that when the rollers 6 on one bevel gear 3 side roll in the direction in which the diameters of the raceway surfaces 3b and 5b decrease (or increase), the rollers 6 on the other bevel gear 3 roll in the direction in which the diameters of the raceway surfaces 3b and 5b increase (or decrease). Thereby, an equal differential limiting force can be produced in either direction of rotation of the bevel gear 3.

Incidentally, the applicant verified the relationship between the tilt angles $\alpha 1$ and $\beta 1$ of the roller and the friction torque P in the range of 3° through 40° of tilt angle $\alpha 1$ and 5° through 85° of tilt angle $\beta 1$ by experiments and theoretical analyses.

Figure 7:
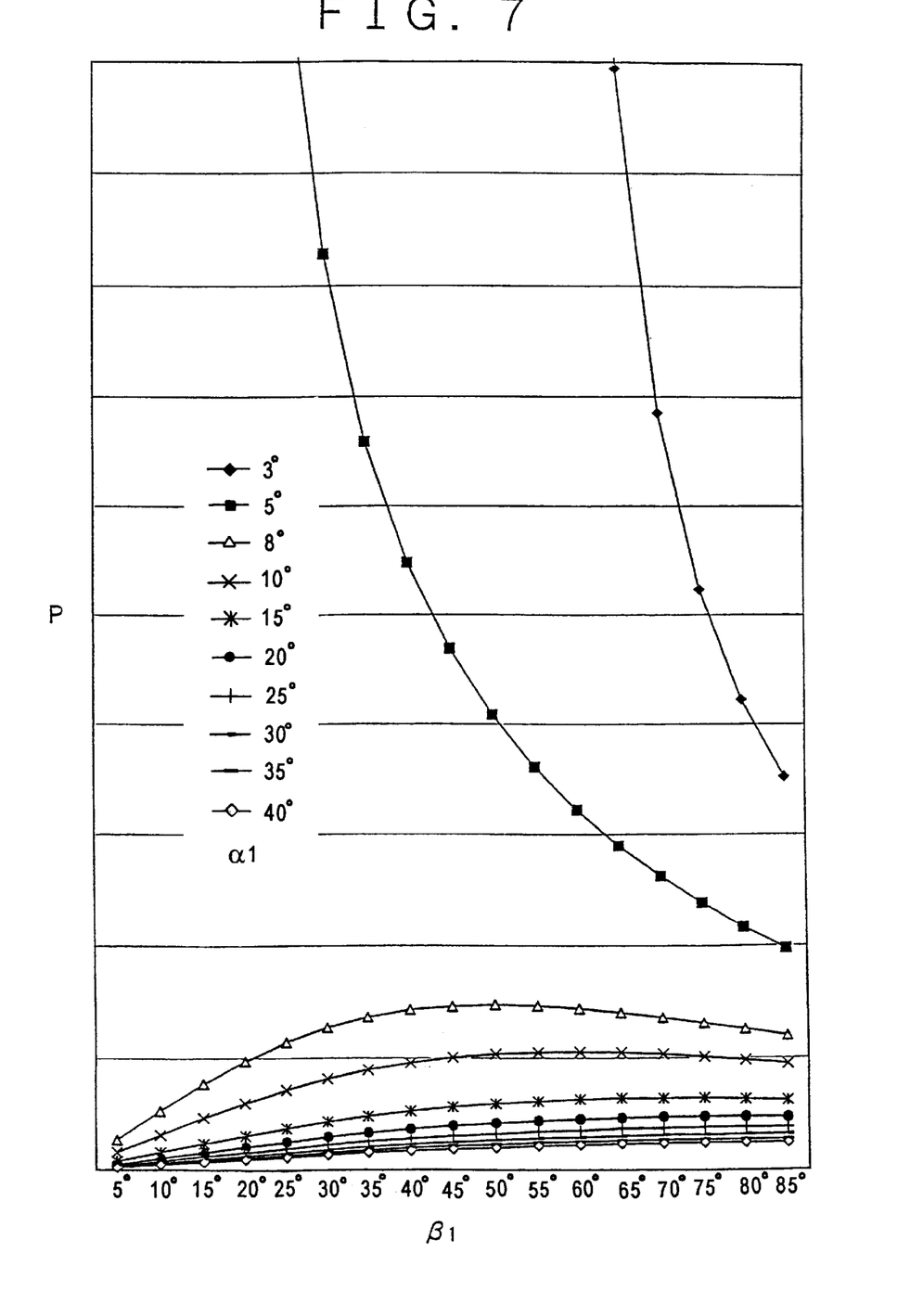
FIG. 7 is a diagram showing the relationship between the tilt angle of the roller and friction torque.
Figure 8:
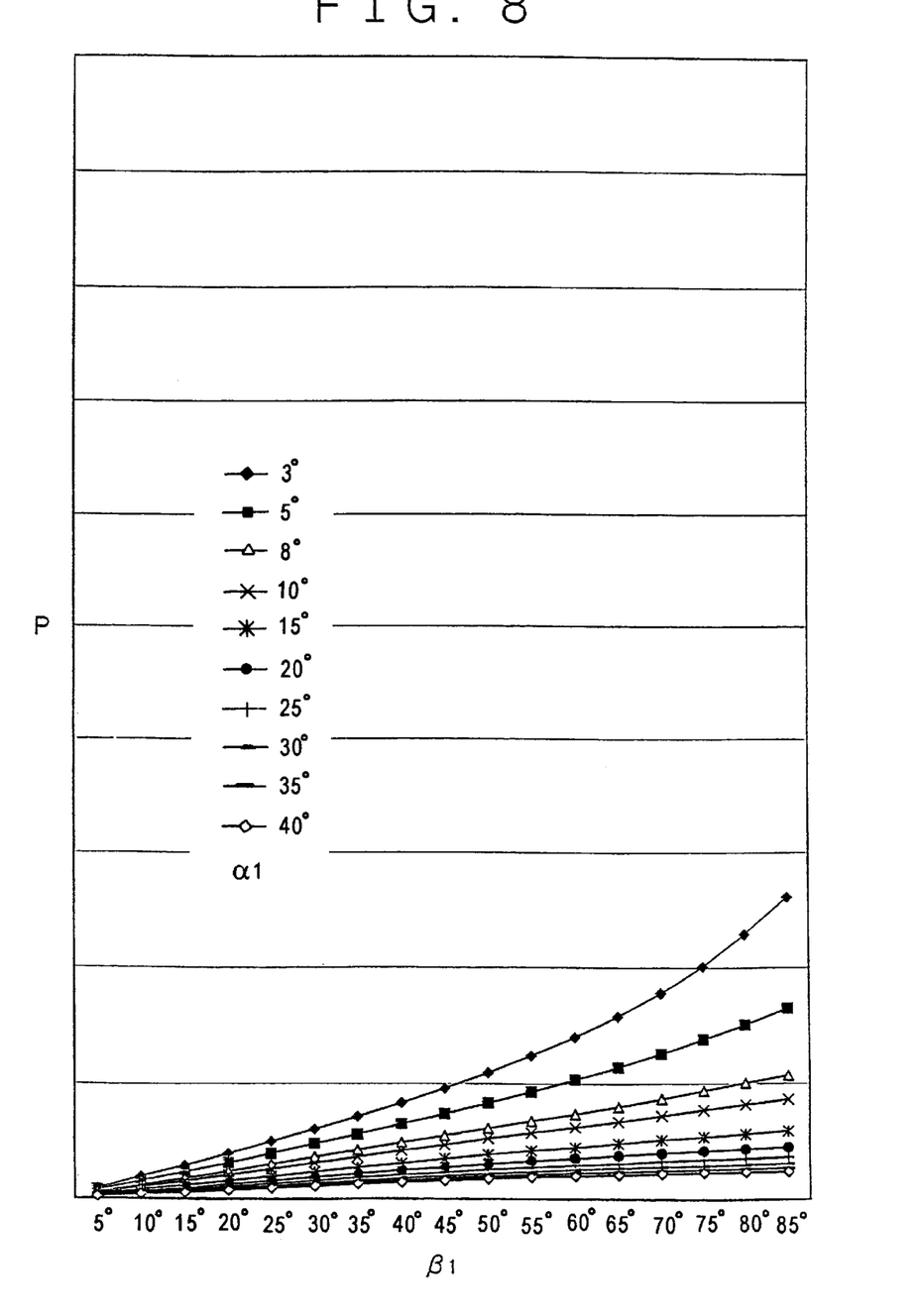
FIG. 8 is a diagram showing the relationship between the tilt angle of the roller and friction torque.

According to the result, as shown in FIG. 7, when the tilt angle $\alpha 1$ of the roller 6 in the normal rotation of the raceway surface 3b is 5° or smaller, the friction torque P suddenly increases as the tilt angle $\beta 1$ decreases, so that the roller 6 and the raceway surfaces 3b and 5b become liable to be locked each other. When the tilt angle $\alpha 1$ is larger than 5°, the friction torque P does not change suddenly. When the tilt angle α1 becomes 20° or larger, the friction torque P above the practically effective value cannot be obtained regardless of the magnitude of the tilt angle β1. On the other hand, when the tilt angle β1 of the roller 6 is larger than 25°, the friction torque P does not exhibit a sudden change except when the tilt angle α1 is 5° or smaller. When the tilt angle β1 is 25° or smaller, the friction torque P decreases greatly, so that the friction torque P above the practically effective value cannot be obtained. Also, in the reverse rotation of the raceway surface 3b as shown in FIG. 8, the friction torque P uniformly decreases as the tilt angle β1 decreases regardless of the magnitude of the tilt angle α1. When the tilt angle α1 is 20° or larger, the friction torque P above the practically effective value cannot be obtained regardless of the magnitude of the tilt angle β1. Also, even when the tilt angle α1 is smaller than 20°, the friction torque P above the practically effective value cannot be obtained when the tilt angle β1 is 25° or smaller. Although verification has not been conducted actually for the case where the tilt angle β1 is larger than 85°, according to the aforementioned experimental data, it is estimated that the friction torque P for the tilt angle β1 up to 90° is approximately equal to that for 85°.

Thus, in the differential gear of this embodiment, the plurality of rollers 6 are provided between the raceway surface 5b of the pressure ring 5 integrally rotating with the gear case 1 and the raceway surface 3b of the bevel gear 3 integrally rotating with the drive shaft. In addition, the angle α1 that the axis of rolling of the roller 6 makes with the axis of rotation of the raceway surfaces 3b and 5b is set so as to be larger than 5° and smaller than 20°, and the angle β1 that the axis of rolling of the roller 6 makes with the plane including the axis of rotation of the raceway surfaces 3b and 5b is set so as to be larger than 25° and smaller than 90°. Thereby, a stable frictional force can always be produced between the roller 6 and the raceway surfaces 3b and 5b, so that a differential limiting force without producing a stick-slip even in low-speed rotation can be obtained. In this case, the magnitude of the frictional force can be changed by setting the magnitude of the tilt angle of the roller 6 arbitrarily, so that the intended differential limiting force can be obtained.

Figure 9:
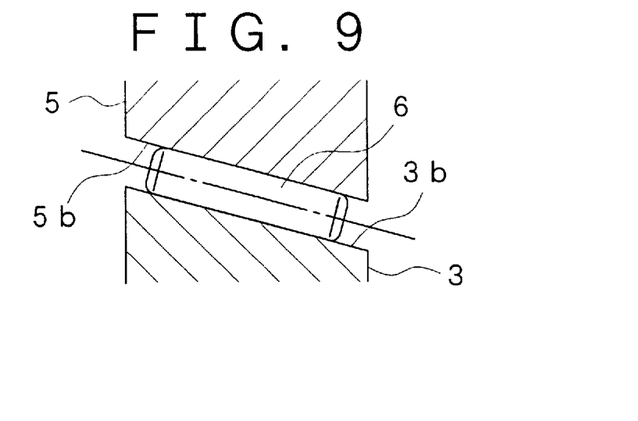
FIG. 9 is a sectional view taken along the line II—II of FIG. 4, when raceway surfaces and an outer peripheral surface of the roller are formed straight.
Figure 10:
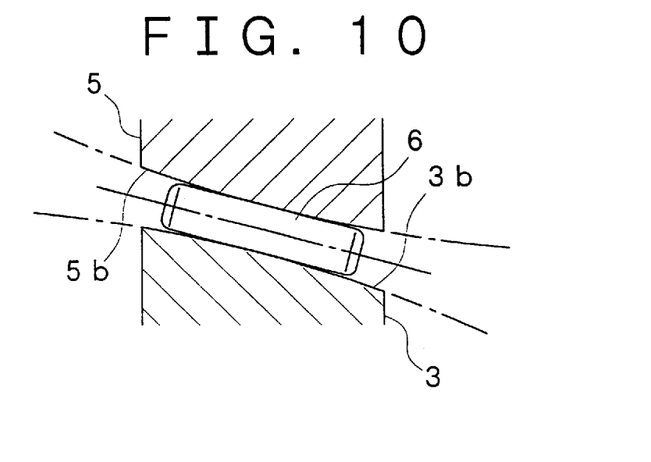
FIG. 10 is a sectional view taken along the line II—II of FIG. 4, when raceway surfaces are formed curvedly.
Figure 11:
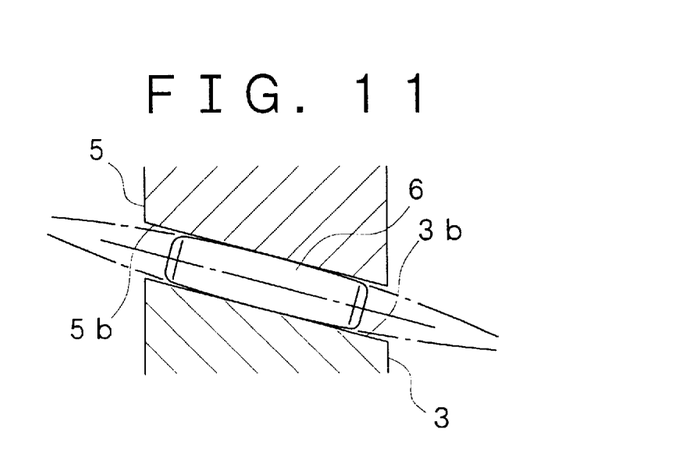
FIG. 11 is a sectional view taken along the line II—II of FIG. 4, when an outer peripheral surface of the roller is formed curvedly.

Also, in the configuration of the above-described embodiment, in the sectional view taken along the line II—II of FIG. 4, that is, in the cross section including the axis of rolling 6a of the roller 6, when the raceway surfaces 3b and 5b are brought into contact with the outer peripheral surface of the roller 6 uniformly in the axial direction as shown in FIG. 9, the contact pressures at both ends in the axial direction of the roller 6 become higher than the contact pressure in the center thereof. Therefore, if the raceway surfaces 3b and 5b are formed into a curved shape which is convex with respect to the outer peripheral surface of the roller 6 in the cross section including the axis of rolling of the roller 6 as shown in FIG. 10, the contact pressures at both ends in the axial direction of the roller 6 can be decreased. Thereupon, nonuniform wear of the roller 6 can be reduced by forming the curved shape of the raceway surfaces 3b and 5b so that the contact pressure in the axial direction of the roller 6 is uniform. Also, even if the raceway surfaces 3b and 5b are formed into a straight form in the cross section including the axis of rolling of the roller 6 as shown in FIG. 11, the same effect as described above can be achieved by forming the outer peripheral surface of the roller 6 into a curved shape which is convex with respect to the raceway surfaces 3b and 5b.

Figure 12:
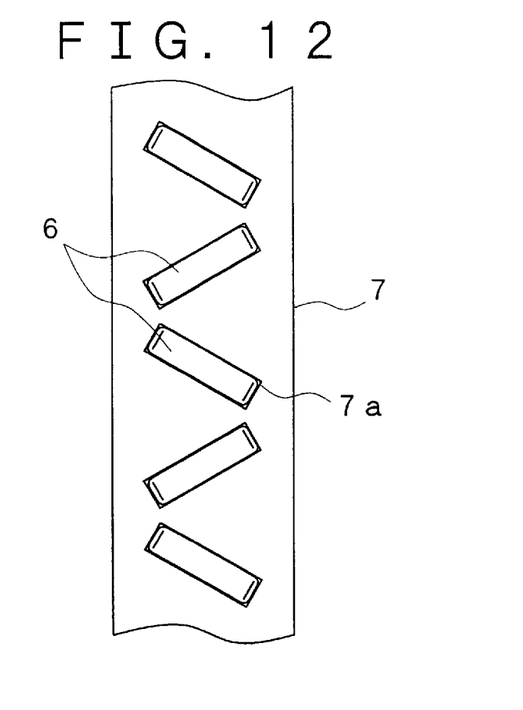
FIG. 12 is a development of the rollers and the cage, showing another example of roller arrangement.
Figure 13A:
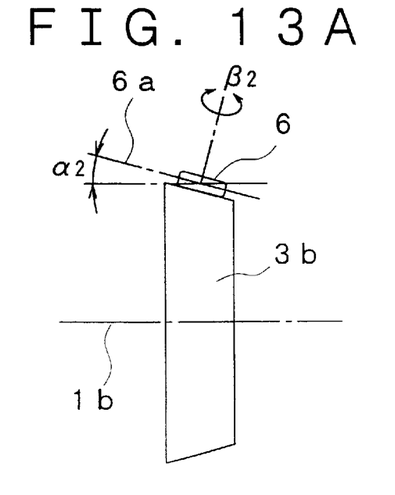
FIG. 13A is a schematic view showing a tilt angle of the roller.
Figure 13B:
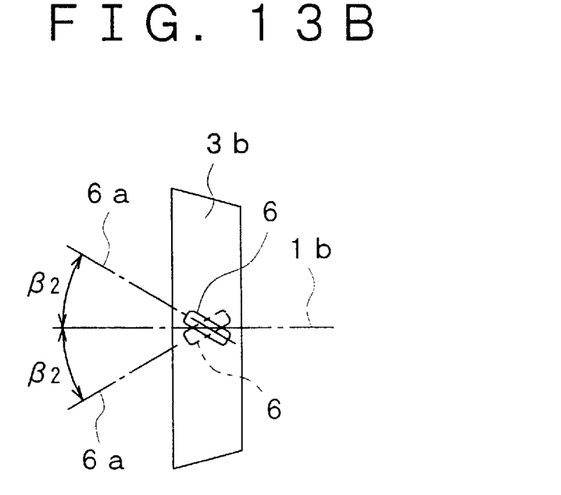
FIG. 13B is a schematic view showing a tilt angle of the roller.
Figure 14:
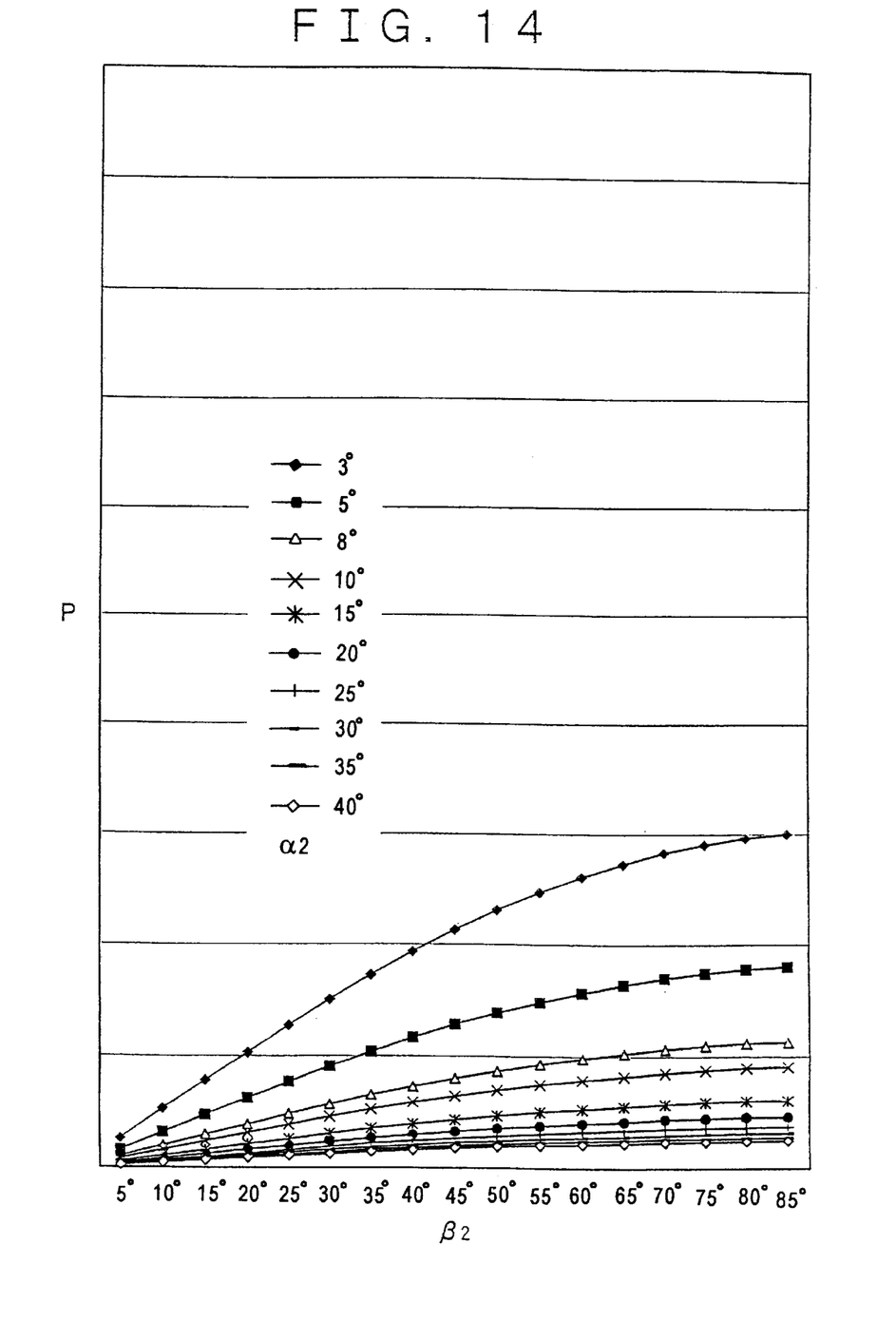
FIG. 14 is a diagram showing the relationship between the tilt angle of the roller and friction torque.

FIGS. 12 through 14 show another example of roller arrangement. FIG. 12 is a development of the rollers and the cage, FIGS. 13A and 13B are schematic views showing the tilt angle of the roller, and FIG. 14 is a diagram showing the relationship between the tilt angle of the roller and the friction torque.

According to these figures, the same number of rollers 6 shown in the figures are tilted in the opposite direction alternately with respect to the plane including the axis of rotation of the rotating body 1. The axis of rolling 6a of the roller 6 makes a predetermined tilt angle α2 with respect to the axis of rotation 1b of the gear case 1 as shown in FIG. 13A, and makes a predetermined tilt angle β2 with respect to the plane including the axis of rotation 1b as shown in FIG. 13B. In this case, the tilt angle α2 of the roller 6 is set so as to be larger than 3° and smaller than 20°, and the tilt angle β2 is set so as to be larger than 25° and smaller than 90°. The tilt angle β2 is an angle viewed from the direction perpendicular to the axis of rolling 6a of the roller 6.

By the above configuration, a frictional force in proportional to an thrust force F in the axial direction is produced between the roller 6 and the raceway surfaces 3b and 5b, like the above-described embodiment. In this case, since the same number of rollers 6 are tilted in the opposite direction alternately with respect to the plane including the axis of rotation of the raceway surfaces 3b and 5b, an equal frictional force is produced even in either rotational direction of the raceway surface 3b.

In this embodiment, the applicant verified the relationship between the tilt angles α2 and β2 of each roller and the friction torque P in the range of 3° through 40° of tilt angle α2 and 5° through 85° of tilt angle β2 by experiments and theoretical analyses.

According to the result, as shown in FIG. 14, the friction torque P decreases uniformly as the tilt angle β2 decreases regardless of the magnitude of the tilt angle α2 of the roller. When the tilt angle α2 is 20° or larger, the friction torque P above the practically effective value cannot be obtained regardless of the magnitude of the tilt angle β2. Also, even when the tilt angle α2 is smaller than 20°, the friction torque P above the practically effective value cannot be obtained if the tilt angle β2 is 25° or smaller. Although verification has not been conducted actually for the case where the tilt angle β2 is larger than 85°, according to the aforementioned experimental data, it is estimated that the friction torque P for the tilt angle β2 up to 90° is approximately equal to that for 85°.

Figure 15:
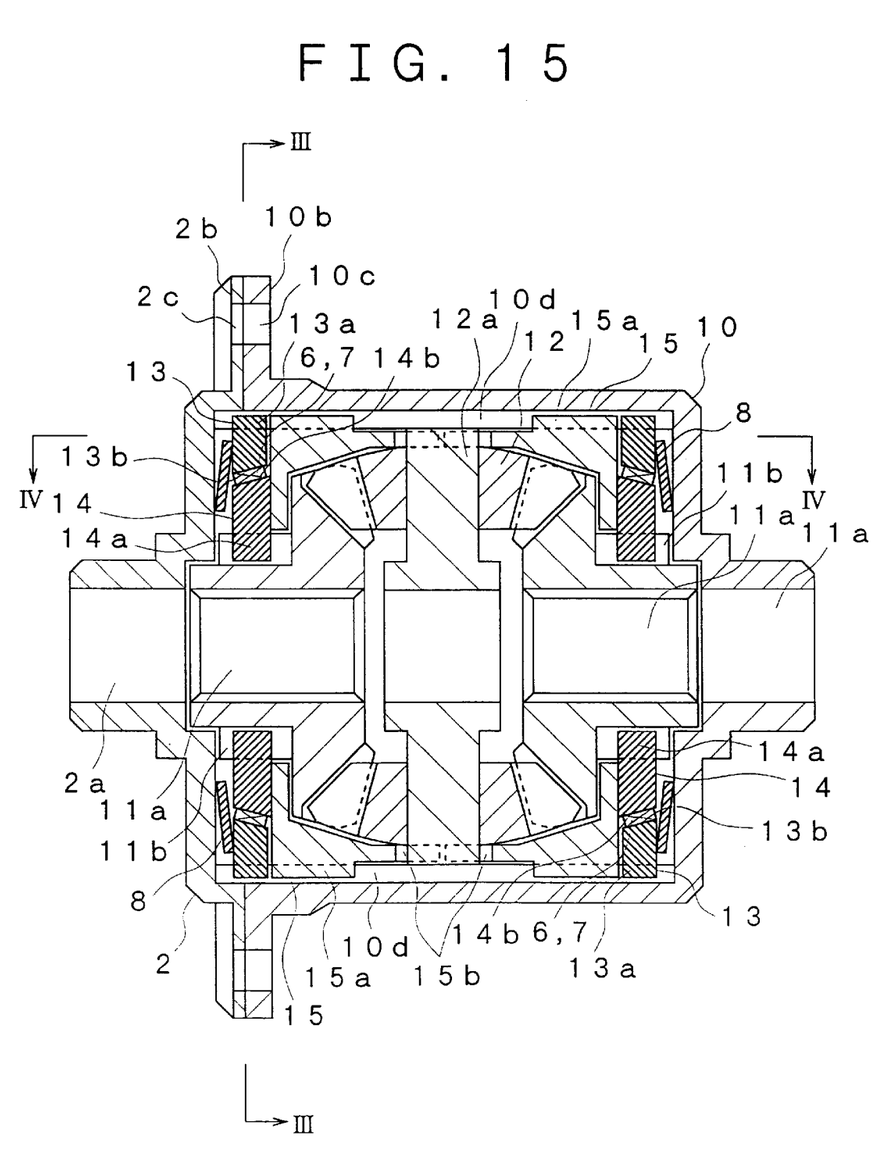
FIG. 15 is a side sectional view of a differential gear in accordance with a second embodiment of the present invention.
Figure 16:
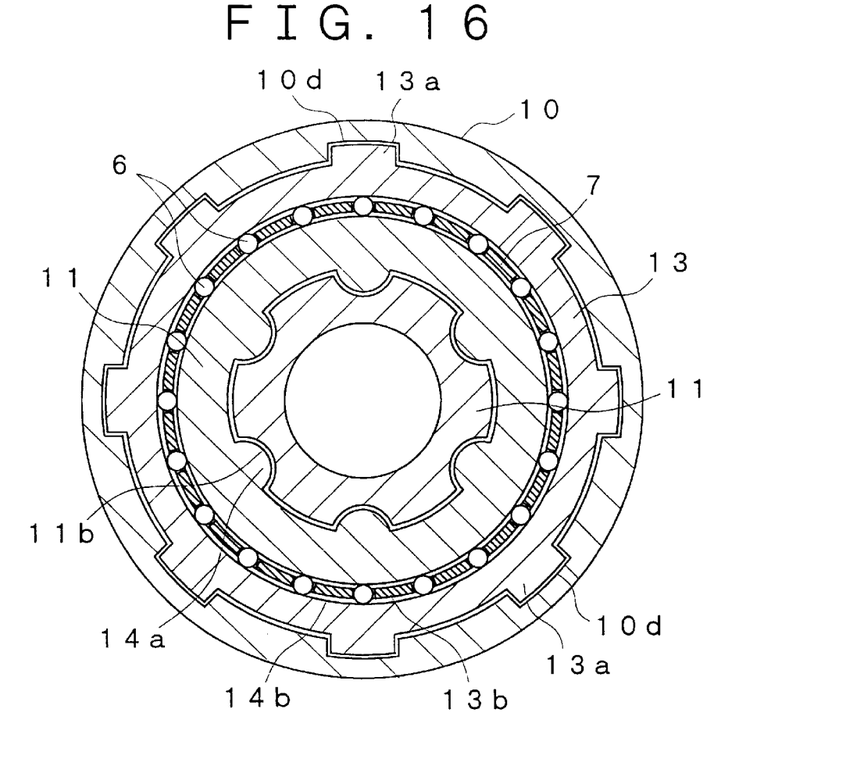
FIG. 16 is a sectional view taken along the line III—III of FIG. 15.
Figure 17:
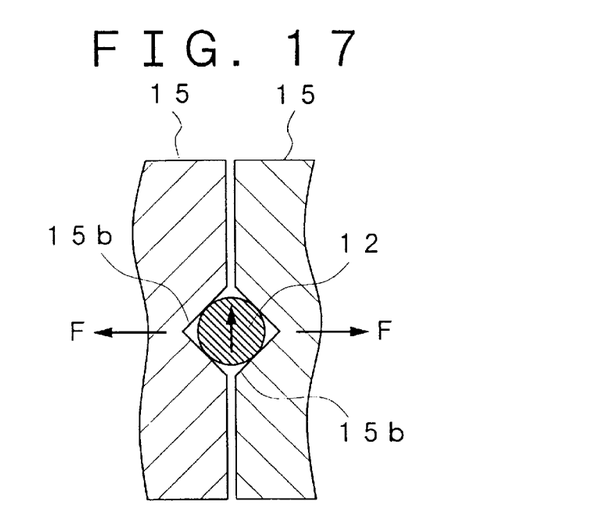
FIG. 17 is a partially sectional view taken along the line IV—IV of FIG. 15.

FIGS. 15 through 17 show a second embodiment of the present invention. In these figures, the same reference numerals are applied to elements of this embodiment which are essentially the same as the elements of the first embodiment, and the detailed description of those elements is omitted.

The differential gear of this embodiment comprises a gear case 10, a gear case cover 2 for closing one end of the gear case 10, a pair of bevel gears 11 disposed coaxially so as to be opposed to each other, a plurality of pinion gears 12 disposed between the bevel gears 11, a pair of first pressure rings 13 integrally rotating with the gear case 10, a pair of second pressure rings 14 integrally rotating with the bevel gear 11, a plurality of rollers 6 disposed between the first and second pressure rings 13 and 14, cages 7 for rotatably holding the rollers 6 at intervals, a pair of cone springs 8 for pressing the first pressure ring 13 against the second pressure ring 14, and a pair of third pressure rings 15 for pressing the second pressure ring 14 against the first pressure ring 13. The gear case 10, the gear case cover 2, and the first and third pressure rings 13 and 15 constitute an input-side rotating body, and the bevel gears 11 and the second pressure rings 14 configure an output-side rotating body.

The gear case 10 has a cylindrical shape whose one end is open, and a bearer 10a for supporting one bevel gear 11 is provided on the other end side thereof. A flange 10b is provided around the gear case 10, and the flange 10b is formed with a plurality of holes 10c for bolt insertion. Also, a plurality of grooves 10d extending in the axial direction are formed at intervals in the peripheral direction on the inner surface of the gear case 10. In FIG. 16, the illustration of the flange 10b is omitted.

The bevel gears 11 are arranged so that the tooth sides are opposed to each other, and they each have a connecting portion 11a for connecting with a drive shaft (not shown) on the wheel side. On the back surface side of the bevel gear 11, a plurality of grooves 11b extending in the axial direction are formed at intervals in the peripheral direction.

Each pinion gear 12 is rotatably fixed to a pinion shaft 12a, and meshes with the bevel gears 11.

Each first pressure ring 13 is formed into a ring shape with the axis of rotation being the center, and a plurality of protrusions 13a each fitting in the groove 10d in the gear case 10 are provided on the outer peripheral surface of the first pressure ring 13. That is to say, the first pressure ring 13 is supported on the gear case 10 so as to be movable in the axial direction. Also, a raceway surface 13b opposed to the second pressure ring 14 is formed on the inner peripheral surface of the first pressure ring 13.

Each second pressure ring 14 is formed into a ring shape with the axis of rotation being the center, and a plurality of protrusions 14a each fitting in the groove 11b in the bevel gear 11 are provided on the inner peripheral surface of the second pressure ring 14. That is to say, the second pressure ring 14 is supported on the bevel gear 11 so as to be movable in the axial direction. Also, a raceway surface 14b opposed to the raceway surface 13b of the first pressure ring 13 is formed on the inner peripheral surface of the second pressure ring 14. The raceway surfaces 13b and 14b in this embodiment are formed in the same way as in the first embodiment.

Each third pressure ring 15 is formed so as to cover the bevel gear 11 and the pinion gear 12 from both end sides in the axial direction, and a plurality of protrusions 15a each fitting in the groove 10d of the gear case 10 are provided on the outer peripheral surface thereof at intervals in the peripheral direction. That is to say, the third pressure ring 15 is supported on the gear case 10 so as to be movable in the axial direction, and abuts on one end surface of the second pressure ring 14 in one axial direction (in the direction in which the raceway surface 14b approaches the raceway surface 13b). Also, a plurality of V-shaped grooves 15b are formed in the opposed surface of the third pressure ring 15 at intervals in the peripheral direction, and a pinion shaft 12a is accommodated in each of the groove 15b as shown in FIG. 17.

In the differential gear configured as described above, a ring gear (not shown) connected to the engine side is fitted to the flange 10b of the gear case 10 so that the gear case 10 is rotated by the driving force from the engine. In this case, when a difference in rotation occurs between the drive shafts (not shown) of both driving wheels during the turning of a vehicle, the pinion gears 12 between the bevel gears 11 are rotated, by which the differential motion of the drive shafts is achieved. Also, when the driving force is applied to the gear case 10, the V-shaped groove 15b of each third pressure ring 15 presses on the pinion shaft 12a, so that a thrust force F in the axial direction is produced on the third pressure ring 15 by the inclined surface of the groove 15b as shown in FIG. 17. When a difference in rotation is thereby produced between the drive shafts, the rollers 6 roll while being pressed on the raceway surfaces 13b and 14b of the first and second pressure rings 13 and 14, so that a differential limiting force is produced by a frictional force between the rollers 6 and the raceway surfaces 13b and 14b. The tilt angle of the roller 6 and the principle of the occurrence of frictional force are the same as in the first embodiment.

Thus, according to the differential gear of this embodiment, like the first embodiment, a frictional force is produced by the rolling of the rollers 6, by which a stable differential limiting force can always be obtained, and also a thrust force can be produced surely by the pressing of the third pressure rings 15, so that an effective differential limiting force can always be obtained.

What is claimed is:

1. A differential gear having an input-side rotating body rotating on the axis by an external driving force, a pair of output-side rotating bodies arranged coaxially with the input-side rotating body, and a differential transmission mechanism for transmitting a rotational force of the input-side rotating body to each of the output-side rotating bodies while allowing the difference in rotation between the output-side rotating bodies, comprising:

a plurality of rollers which are arranged between a raceway surface integrally rotating with the input-side rotating body and a raceway surface integrally rotating with the output-side rotating body, and roll while contacting with the raceway surfaces when a difference in rotation occurs between the output-side rotating bodies; and a roller holder for rotatably holding the rollers at intervals in the peripheral direction of the raceway surfaces, wherein:

the axes of rolling of the rollers are tilted so as to make an angle smaller than 20° with respect to the axis of rotation of the input-side and output-side rotating bodies, and are tilted so as to make an angle larger than 25° and smaller than 90° with respect to a plane including the axis of rotation of the input-side and output-side rotating bodies.

2. The differential gear according to claim 1, wherein: the raceway surfaces are formed into a convex shape with respect to the outer peripheral surface of the roller in a cross section including the axis of rolling of the roller.

3. The differential gear according to claim 1, wherein: the outer peripheral surface of the roller is formed into a convex shape with respect to the raceway surfaces in a cross section including the axis of rolling of the roller.

4. The differential gear according to claim 1, wherein: the axes of rolling of the rollers are tilted so as to make an angle larger than 5° with respect to the axis of rotation of the input-side and output-side rotating bodies, and are tilted in the same direction so as to make a predetermined angle with respect to the plane including the axis of rotation of the input-side and output-side rotating bodies.

5. The differential gear according to claim 4, wherein: the raceway surfaces are formed into a convex shape with respect to the outer peripheral surface of the roller in a cross section including the axis of rolling of the roller.

6. The differential gear according to claim 4, wherein: the outer peripheral surface of the roller is formed into a convex shape with respect to the raceway surfaces in a cross section including the axis of rolling of the roller.

7. The differential gear according to claim 1, wherein:

the axes of rolling of the rollers are tilted so as to make an angle larger than 3° with respect to the axis of rotation of the input-side and output-side rotating bodies, and each of a predetermined number of axes of rolling of the rollers are alternately tilted in the opposite direction so as to make a predetermined angle with respect to the plane including the axis of rotation of the input-side and output-side rotating bodies.

8. The differential gear according to claim 7, wherein:

the raceway surfaces are formed into a convex shape with respect to the outer peripheral surface of the roller in a cross section including the axis of rolling of the roller.

9. The differential gear according to claim 7, wherein:

the outer peripheral surface of the roller is formed into a convex shape with respect to the raceway surfaces in a cross section including the axis of rolling of the roller.

10. The differential gear according to claim 7, wherein:

the same number of rollers tilted in the opposite direction with respect to the plane including the axis of rotation of the input-side and output-side rotating bodies are alternately arranged in the peripheral direction of the input-side and output-side rotating bodies.

11. The differential gear according to claim 10, wherein:

the raceway surfaces are formed into a convex shape with respect to the outer peripheral surface of the roller in a cross section including the axis of rolling of the roller.

12. The differential gear according to claim 10, wherein:

the outer peripheral surface of the roller is formed into a convex shape with respect to the raceway surfaces in a cross section including the axis of rolling of the roller.

* * * * *